US 010473441 B2

(12) United States Patent
Wall et al.

(10) Patent No.: US 10,473,441 B2
(45) Date of Patent: Nov. 12, 2019

(54) DISSOLVABLE PROJECTILES

(71) Applicant: Genics Inc., Acheson (CA)

(72) Inventors: Wesley Wall, Edmonton (CA); Adam Wall, Acheson (CA); Ray Whitaker, Acheson (CA); Wade Chute, Acheson (CA); Shekaib Adab, Acheson (CA)

(73) Assignee: Genics Inc., Acheson (CA)

( * ) Notice: Subject to any disclaimer, the term of this patent is extended or adjusted under 35 U.S.C. 154(b) by 0 days.

(21) Appl. No.: 16/125,459

(22) Filed: Sep. 7, 2018

(65) Prior Publication Data

US 2019/0003808 A1  Jan. 3, 2019

Related U.S. Application Data

(62) Division of application No. 15/430,196, filed on Feb. 10, 2017, now Pat. No. 10,094,645.

(60) Provisional application No. 62/293,659, filed on Feb. 10, 2016.

(51) Int. Cl.
| | |
|---|---|
| *F42B 12/74* | (2006.01) |
| *F42B 33/00* | (2006.01) |
| *C03C 3/14* | (2006.01) |
| *C03C 4/00* | (2006.01) |
| *C03B 19/02* | (2006.01) |
| *F42B 12/72* | (2006.01) |
| *F42B 7/12* | (2006.01) |

(52) U.S. Cl.
CPC .............. *F42B 12/74* (2013.01); *C03B 19/02* (2013.01); *C03C 3/14* (2013.01); *C03C 4/0064* (2013.01); *F42B 33/00* (2013.01); *F42B 7/12* (2013.01); *F42B 12/72* (2013.01)

(58) Field of Classification Search
CPC ........ F42B 12/74; F42B 12/72; F42B 12/745; F42B 33/00
USPC .......................... 102/439, 501, 506, 515–517
See application file for complete search history.

(56) References Cited

U.S. PATENT DOCUMENTS

| | | |
|---|---|---|
| 4,102,664 A | 7/1978 | Dumbaugh, Jr. |
| 4,294,655 A | 10/1981 | Pfeffer |
| 4,587,267 A | 5/1986 | Drake et al. |
| 4,904,522 A | 2/1990 | Markusch |
| 5,573,055 A | 11/1996 | Melling et al. |
| 5,846,305 A | 12/1998 | Payzant |
| 5,997,971 A | 12/1999 | Wall et al. |
| 6,001,279 A | 12/1999 | Payzant et al. |

(Continued)

FOREIGN PATENT DOCUMENTS

| | | |
|---|---|---|
| CA | 2 240 216 A1 | 12/1999 |
| EP | 2 374 991 A2 | 10/2011 |

(Continued)

OTHER PUBLICATIONS

NPL: "Custom Made Borosilicate Glass Bullets Experiment", https://www.youtube.com/watch?v=a8JMeGhxvUo Jan. 26, 2015.*

*Primary Examiner* — John Cooper
(74) *Attorney, Agent, or Firm* — Christensen O'Connor Johnson Kindness, PLLC

(57) ABSTRACT

A dissolvable glass projectile for a firearm is molded from dissolvable glass for the ammunitions and firearms industry. The dissolvable glass projectile may be molded into different sizes or geometry based on firearm and user preference. A mixture of chemicals components are heated and melted and then poured into a mold and is allowed to cool to a solid that can be handled.

3 Claims, 2 Drawing Sheets

(56) References Cited

U.S. PATENT DOCUMENTS

| | | | |
|---|---|---|---|
| 6,138,422 A | 10/2000 | Wall et al. | |
| 6,168,870 B1 | 1/2001 | Wall | |
| 6,186,072 B1 * | 2/2001 | Hickerson, Jr. | F42B 12/06 102/517 |
| 6,302,028 B1 | 10/2001 | Guillot-Ulmann et al. | |
| 6,358,531 B1 | 3/2002 | Day et al. | |
| 6,881,766 B2 | 4/2005 | Hain | |
| 6,931,993 B1 * | 8/2005 | Manole | F42B 12/38 102/458 |
| 6,990,905 B1 * | 1/2006 | Manole | F42B 12/40 102/513 |
| 7,055,438 B1 * | 6/2006 | Manole | F42B 12/38 102/502 |
| 7,160,606 B2 | 1/2007 | Wall et al. | |
| 7,661,481 B2 | 2/2010 | Todd et al. | |
| 7,713,553 B2 | 5/2010 | Wall et al. | |
| 8,096,243 B2 * | 1/2012 | Glasser | F42B 12/44 102/501 |
| 8,430,173 B2 | 4/2013 | Todd et al. | |
| 8,430,174 B2 | 4/2013 | Holderman et al. | |
| 8,597,419 B2 | 12/2013 | Betts | |
| 2001/0045173 A1 * | 11/2001 | Gibson | F42B 10/24 102/513 |
| 2004/0074643 A1 | 4/2004 | Munoz, Jr. et al. | |
| 2005/0016412 A1 * | 1/2005 | Vasel | F42B 7/08 102/502 |
| 2005/0188886 A1 * | 9/2005 | Vasel | F41B 11/57 102/502 |
| 2007/0277979 A1 | 12/2007 | Todd et al. | |
| 2011/0247833 A1 | 10/2011 | Todd et al. | |
| 2011/0293955 A1 * | 12/2011 | Trowbridge | C23C 26/00 428/457 |
| 2012/0061088 A1 | 3/2012 | Dykstra et al. | |
| 2016/0223307 A1 * | 8/2016 | Bray | F42B 30/02 |
| 2016/0265889 A1 * | 9/2016 | Golloher | F42B 12/34 |
| 2017/0234664 A1 * | 8/2017 | Golloher | F42B 12/367 102/510 |
| 2017/0234665 A1 * | 8/2017 | Reilly | F41A 9/38 89/125 |
| 2017/0268858 A1 * | 9/2017 | Morse | F42B 12/367 |

FOREIGN PATENT DOCUMENTS

| | | |
|---|---|---|
| GB | 542630 | 1/1942 |
| WO | 00/02004 A2 | 1/2000 |
| WO | 03/025303 A1 | 3/2003 |
| WO | 2008/086604 A1 | 7/2008 |
| WO | 2011/130063 A2 | 10/2011 |
| WO | 2015/095745 A1 | 6/2015 |

* cited by examiner

DISSOLVABLE PROJECTILES

FIELD

This relates to a dissolvable projectile, molded from a dissolvable glass material, which may be molded into varying shapes and sizes for use as ammunition with a firearm.

BACKGROUND

Dissolvable glasses made up of various compositions are used for multiple applications that include wood preservation, bone repair, and downhole processing. For example, U.S. Pat. No. 8,430,174 (Holderman et al.) entitled "Anhydrous boron-based timed delay plugs" describes the use of dissolvable glass plugs manufactured from anhydrous boron for downhole applications in hydrocarbon-producing wells.

SUMMARY

According to an aspect, there is provided a dissolvable glass projectile molded from dissolvable glass.

According to another aspect, there is provided a projectile attached to a shell or casing, and the projectile may be a dissolvable glass pellet for use in shotgun shells, or a projectile for use in a rifled barrel.

According to another aspect, the dissolvable glass projectile may contain a tranquilizing component.

According to another aspect, the dissolvable glass projectile may contain a vaccination and serve as a vessel.

According to another aspect, the dissolvable glass projectile may contain an implant as a component.

According to another aspect, the mixture may comprise equal measures by weight of boric acid and disodium octaborate tetrahydrate.

According to another aspect, the mixture may comprise one or more compounds selected from a group consisting of: hydrated alkaline borates, hydrated nonalkaline borates, refined borate, mineral borate, sodium borate, sodium metaborate, disodium octaborate tetrahydrate, borax, boric acid, copper borate, lithium borate, potassium borate, silver borate, zinc borate, boron halide, colemanite, kernite, probertite, tincal, and ulexite.

According to another aspect, there is provide a method of forming a dissolvable projectile for a firearm, the projectile being formed of amorphous borate, the method comprising the steps of: providing a boron mixture comprising one or more hydrated boron compounds; melting the boron mixture by heating the boron mixture to a target temperature; applying heat to release water from the boron mixture to form a moldable anhydrous boron compound; molding the moldable anhydrous boron compound in a mold, the mold being maintained at a mold temperature that is above an ambient temperature; cooling the moldable anhydrous boron compound to form a solid by maintaining the mold at the mold temperature for at least 1 minute and then cooling the moldable anhydrous boron compound to the ambient temperature over a period of at least 4 hours; and attaching the solid to a casing or shell containing a propellant.

The method may further comprise any one or more of the following aspects: the step of adding an additive to the mixture to adjust a dissolve rate of the solid; the method may further comprise the step of adjusting the dissolvability by adding an additive selected from a group I, group II, and group III metal on the periodic table; the method may further comprise the step of adjusting the dissolvability by adding an additive selected from a group consisting of: copper, manganese, molybdenum, zinc, calcium, and silver; the boron mixture comprises one or more compounds selected from a group consisting of: hydrated alkaline borates, hydrated nonalkaline borates, refined borate, mineral borate, sodium borate, sodium metaborate, disodium octaborate tetrahydrate, borax, boric acid, copper borate, lithium borate, potassium borate, silver borate, zinc borate, boron halide, colemanite, kernite, probertite, tincal, and ulexite. The method may further comprise the step of selecting the amount of the hydrated boron compounds in the boron mixture to adjust a dissolve rate of the solid; the mixture may be heated to a temperature of between about 340° F. and about 1900° F.; the mixture may be heated to a temperature of between about 1500° F. and about 1700° F.; the mixture may be poured into a mold having a temperature of between about 300° F. and about 1200° F.; the mixture may be poured into a mold having a temperature of between about 600° F. and about 900° F.; there may be a step of selecting the amount of the one or more hydrous compounds in the mixture to adjust a dissolve rate of the solid; the mixture may comprise one or more additives having at least one of corrosion resistant and antibacterial properties.

According to another aspect, the anhydrous boron compound may comprise between about 12-20 mol % $Na_2O$ and between about 80-88 mol % $B_2O_3$, or about 18 mol % $Na_2O$ and about 82 mol % $B_2O_3$.

According to an aspect, there is provided a dissolvable borate part, comprising an anhydrous borate compound that is molded to form an object having a Young's Modulus of at least 30 GPa, the anhydrous borate compound comprising between about 75 and 90% mol of $B_2O_3$; and between about 10 and 25% mol of one or more alkali oxide.

According to another aspect, the dissolvable borate part may comprise about 82 mol % of $B_2O_3$ and about 18 mol % of the one or more alkali, and the object has a Young's Modulus of at least 40 GPa.

According to another aspect, a majority of the one or more alkali may comprise $Na_2O$.

According to another aspect, the anhydrous borate compound may be substantially free of silicate.

According to another aspect, the amount of alkali compound may be such that the alkali oxide is between 10-25%.

According to another aspect, the anhydrous boron compound may comprise between about 12-20 mol % $Na_2O$ and between about 80-88 mol % $B_2O_3$, or about 18 mol % $Na_2O$ and about 82 mol % $B_2O_3$.

According to another aspect, the shape and geometry of the dissolvable glass may be machined or milled into any form.

According to an aspect, there is provided a projectile for a firearm comprising a body molded from dissolvable glass. The body molded from dissolvable glass may be attached to a casing or shell containing a propellant. The projectile may be designed for use in a firearm with a rifled barrel, or the projectile may comprise a plurality of shot in a shotgun casing. The boron mixture may comprise equal measures of boric acid and disodium octaborate tetrahydrate.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION OF A PREFERRED EMBODIMENT

This relates to projectiles made from a dissolvable glass material. The projectile can be made in various shapes and geometries to accommodate various firearms. The shape, design, or geometry of the dissolvable glass bullet will be dependent on the type of firearm and ammunition. Dissolvable glass bullets are molded from dissolvable glass and can be produced as pellets or as tapered shapes that are made to withstand the conditions of use in a firearm, such as the high heat, impact, and speed that will be experienced during use. The varying bullet sizes and shapes of the ammunition are easy to accommodate with the dissolvable glass as the dissolvable glass may be molded or finished to any shape or geometry.

The design of the dissolvable glass bullet needs to ensure that the bullet will not fragment upon being fired by the firearm. The propellant generates a hot gas when ignited, which increase the pressure in the bullet chamber. This pressure pushes on the base of the dissolvable glass bullet and causes the acceleration of the bullet. A common propellant used is gunpowder. As the propellant burns, more volume is created for the gas and as the dissolvable glass bullet travels down the barrel, the volume of gas continues to increase causing further acceleration of the projectile. The dissolvable glass bullet must be able to withstand this heat and pressure. As the bullet is fired from a rifle, the bullet experiences a slight deformation and expansion inside the barrel of the firearm that causes the bullet to engage the rifling of the bore and this introduces the rotation to the bullet that helps stabilize its flight for range and accuracy purposes.

Figure 1:
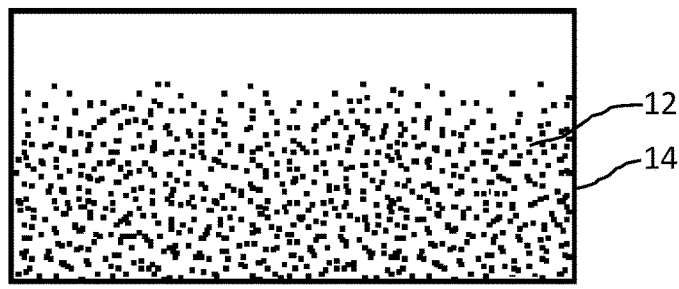
FIG. 1 depicts a mixing step in the process of making a dissolvable glass.

The composition of the dissolvable glass bullet will be a dissolvable material, and in particular, a properly prepared anhydrous boron glass. An example of a process for preparing a suitable material will now be given. Referring to FIG. 1, the method to form the dissolvable bullets begins by assembling an appropriate mixture of components 12. These components will generally be in powder form as this allows the components to be easily measured and mixed together, although the components may be provided in other convenient states.

In one example, the components of the mixture include refined or mineral sources of boron. This may include hydrated alkaline and nonalkaline, mineral or refined borates, such as sodium borate, disodium octaborate tetrahydrate (DOT), sodium metaborate, borax, boric acid, metallic borate compounds such as copper, lithium, potassium, silver, and zinc, and other boron halide materials. Mineral borates may also be used, such as colemanite, kernite, probertite, tincal, ulexite, Neobor™ (available from Borax), etc. In addition, multiple sources of boron may be mixed together in equal or disproportionate amounts.

Some examples of formulations for making the dissolvable glass material include: two-part mixtures made up of boric acid and DOT with about 20-800 wt % and 20-80 wt % of each component being present in the mixture; 95 wt % boric acid and 5 wt % DOT; 2.9 wt % copper hydroxide, 7.1 wt % boric acid, and 90 wt % DOT; and 10 wt % copper hydroxide, 10 wt % boric acid, and 80 wt % DOT. In another example, one or more sources of boron are mixed with one or more sources of alkali metal, such as Na, K, Li, or Ca, preferably one of which is in a hydrous form. For example, DoT is a hydrous form of Na, although Na may also be added in other forms, such as NaOH, or a mixture of hydrous and non-hydrous forms. In addition, boron may be added in hydrous or non-hydrous forms, or combinations thereof. In order to increase modulus and strength of the glass, the Na content of the mixture must be increased. However, a mixed alkali composition could also be used, such as by adding some additional Li, or K, or Ca. These act as surface modifiers and rearrange the crystalline structure of the glass molecules.

The mixture preferably has at least one hydrous compound, such that the mixture is a hydrous mixture when melted. It has been found that this assists in forming a moldable mixture once heated. Other mixtures may also be used. In one preferred example, the mixture was a two-part mixture made up of boric acid and DOT, with at least 25% and up to 75% of each component being present in the mixture. In another example, the mixture may be composed of 95% boric acid and 5% DOT (disodium octaborate tetrahydrate). In a further example, the mixture may be composed of 2.9% copper hydroxide, 7.1% boric acid, and 90% DOT. In an additional further example, the mixture may be composed of 10% copper hydroxide, 10% boric acid, and 80% DOT.

The mixture of all components is mixed and melted to form a liquid state until mixture 12 is at an appropriate state to be molded. While the mixture is initially hydrous, sufficient heat is applied to remove the water in the mixture such that the mixture is anhydrous once it is molded in mold. Once heated properly to form a moldable mixture, the mixture can be placed in mold 16 pertaining to the shape or geometry of the bullet type desired. The mixture must be heated properly and must also be allowed to anneal and cool properly in the mold. The mixture is filled into the molds and allowed to cool until such time that the mixture is solid and can be handled. The time after which the mixture can be removed from the mold will vary by the size, shape, and mass of the bullet being molded. Once sufficiently cooled, the now solidified part may be removed from the mold to continue conditioning to form a stable solid.

In one example, equal portions of boric acid and DOT may be mixed and heated to about 1500° F. Generally speaking, the mixture may be heated to between 340° F. and 1900° F. and more preferably between 1500° F. and 1700° F. Once heated properly to form a moldable mixture, mixture can then be placed in a mold, via pouring. The details of filling molds with mixture are known in the art and will not be described in more detail here.

If the mixture is not heated properly, the resulting object may be weakened and may affect the consistency of the dissolving characteristics of the part. It is believed that the weakness may result from water present in the mixture, and that the effect can be reduced by properly heating the mixture such that the mixture is molded in an anhydrous state. Care must be taken not to heat mixture too long, as the mixture may set such that it cannot be poured. Also, it has been found that a solid anhydrous compound cannot be easily melted and re-molded without a significant increase in the expenditure of energy required.

Figure 2:
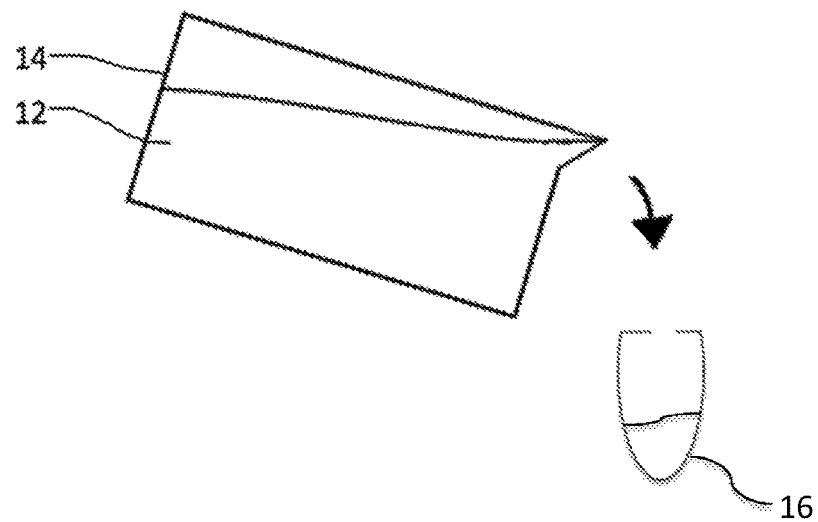
FIG. 2 depicts a molding step in the process of making ammunition of dissolvable glass.

In one example, referring to FIG. 2, the melted mixture 12 may be poured at a minimum temperature of 1500° F. into mold 16 that has been heated to about 700° F. The mold may be at a temperature of between 400° F. and 1500° F. Preferably, mold 16 temperature is between 600° F.-900° F. If the mold temperature is below the minimum, it has been found that the resulting part is not sufficiently sound for the intended purpose. If the mold temperature is too hot, it has been found that the mixture adheres to the metal of the mold.

Once mold 16 is filled with the heated mixture 12, they are cooled until the mixture is a solid and can be handled. The time after which mixture 12 can be removed from the mold will vary by the size and mass of object being molded. It will be understood by one skilled in the art that objects of various diameters and shapes may be formed, and the cooling time will increase as the size of the piece is increased. Care must be taken during these steps as a failure to condition the mixture properly may result in cracking, splitting, deformation or failure of the object prior to end use. Once sufficiently cooled, the now solidified part may then be removed from the mold to continue conditioning to form a stable solid.

Figure 3A:
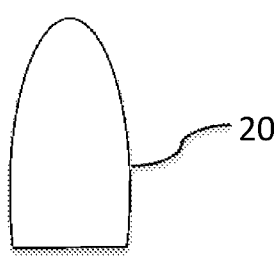
FIG. 3a-3c are examples of shapes that may be used as ammunition.
Figure 3B:
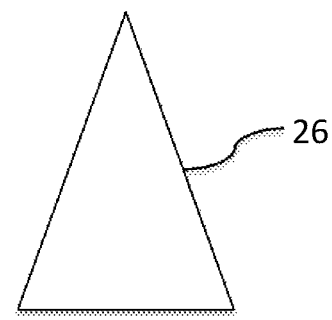
Figure 3C:
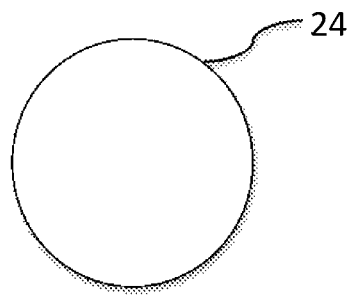
Figure 4:
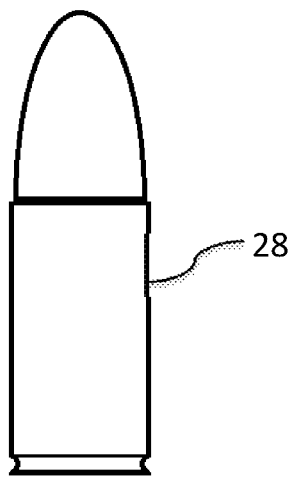
FIG. 4 is a side elevation view of a cartridge for a rifle or handgun.
Figure 5:
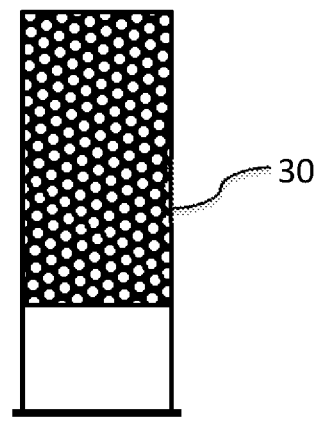
FIG. 5 is a side elevation view in section of a shotgun cartridge.

Various different shapes of bullets and projectiles may be formed. Referring to FIG. 3*a*-3*c*, these may include semi oval shaped 20 as shown in FIG. 3*a* that may be used to form a cartridge 22 as shown in FIG. 4, tapered cone bullets 26 as shown in FIG. 3*b*, pellets 28 as shown in FIG. 3*b* that may be used for shotgun shells 30 as shown in FIG. 5, or others, depending on the preferences of the user.

These glass bullets are designed to be dissolvable, although the rate at which the parts dissolve will depend on temperature, pressure, and the fluids encountered in the environment in which the dissolvable bullet is surrounded with. It is possible to adjust the dissolve rate of the part to be either longer or shorter, depending on the preferences of the user and the type of firearm. The dissolve rate may be modified based on the selection of the components used to create the mixture and the relative proportions of the components in the mixture. The dissolve rate may also be adjusted through the use of additives, such as group I, group II, or group III metals on the periodic table. The dissolvable glass shape or geometry may be used as a delivery method for compounds that act as corrosion inhibitors, such as for example, copper, zinc, and silver. Additionally, the additives may deliver antibacterial compounds such as silver, copper, and zinc compounds or any metalloid that exhibits antibacterial properties. Additives with other properties may also be included in the parts. In addition, other components may be added, such as implants that may be embedded during the molding step. As examples, this may include a vaccination or tranquilizing agent for non-lethal usage of the bullet.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A projectile for a firearm comprising:
    a body molded from dissolvable glass attached to a casing or shell containing a propellant wherein the dissolvable glass is made from a boron mixture comprising equal measures of boric acid and disodium octaborate tetrahydrate.

2. The projectile of claim 1, wherein the projectile is designed for use in a firearm with a rifled barrel.

3. The projectile of claim 1, wherein the casing or shell is a shotgun casing, and the body comprises a plurality of shot in the shotgun casing.

* * * * *